Patented Feb. 4, 1947

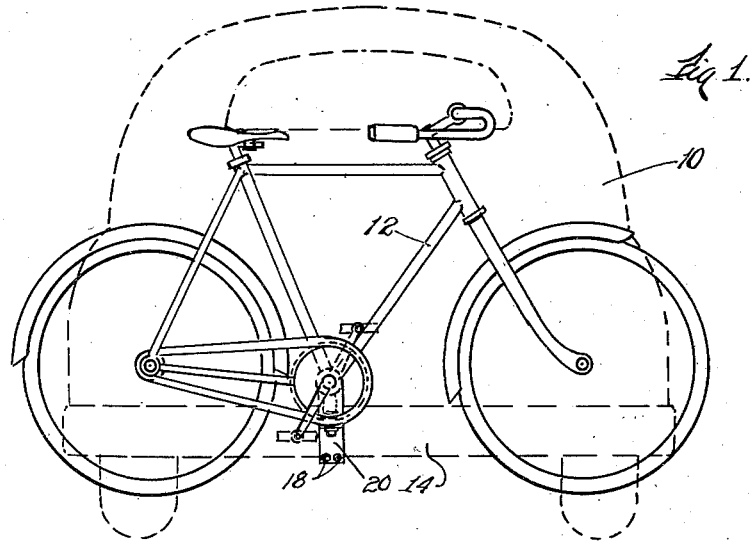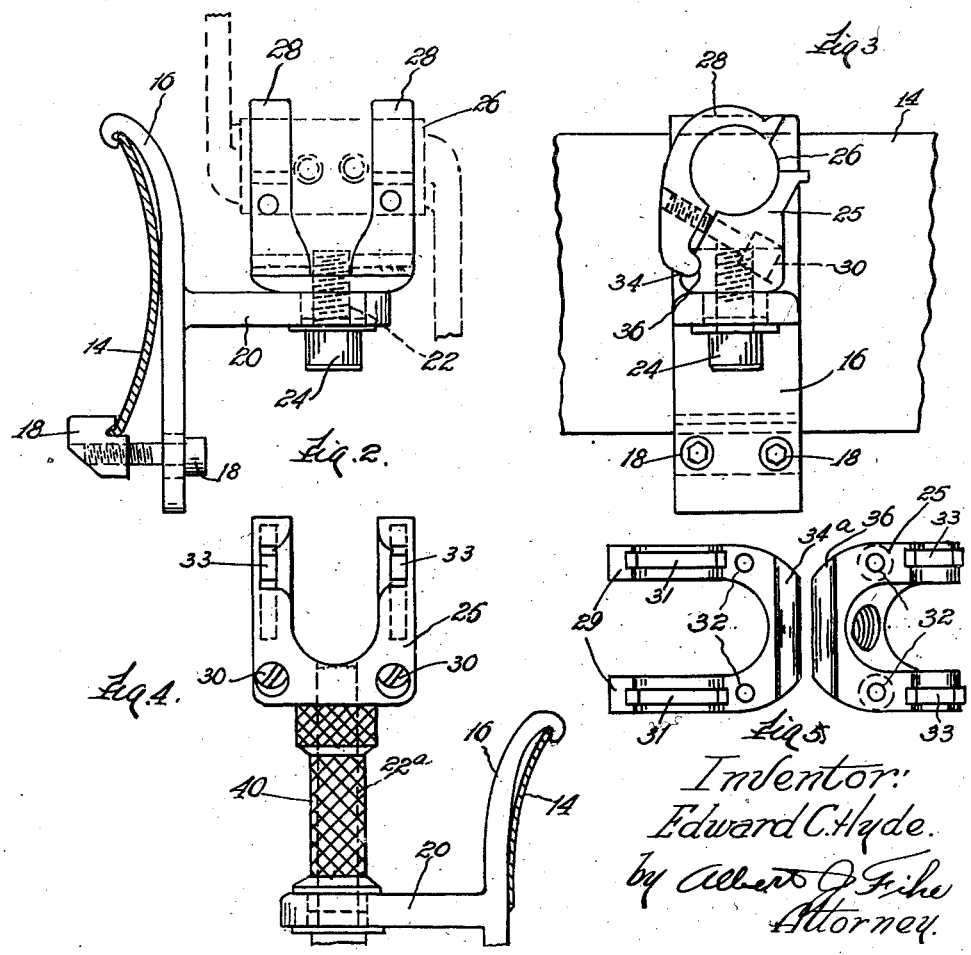

2,415,286

UNITED STATES PATENT OFFICE 2,415,286

BICYCLE HOLDING BRACKET FOR AUTOMOBILES

Edward C. Hyde, Chicago, Ill.

Application December 6, 1945, Serial No. 633,055

9 Claims. (Cl. 224—29)

This invention relates to an improved bicycle holding bracket for automobiles and has for one of its principal objects the provision of means whereby a bicycle, or some similar object, can be conveniently and securely mounted and maintained on an automobile for transportation thereby and therewith.

One of the important objects of the invention is to provide a simple, yet efficient, bracket, or holder, which can be readily mounted on an automobile, particularly the bumper thereof, and which, when so mounted, will adequately support a bicycle, or the like, without danger of the same becoming loose or falling off.

Another and still further important object of the invention is to provide a bracket for holding bicycles on automobiles for transportation purposes, which can be combined with an ordinary trailer hitch so that the automobile can be alternately used for hauling a trailer and readily converted into a satisfactory bicycle carrying device.

Other and further important objects of the invention will be apparent from the disclosures in the accompanying drawing and following specification.

The invention, in a preferred form, is illustrated in the drawing and hereinafter more fully described.

In the drawing:

Figure 1 is a rear view of an automobile showing a bicycle mounted thereon by means of the improved holder of this invention.

Figure 2 is a side elevation of the clamp or holder, showing the same as applied to an automobile bumper and also illustrating in dash lines that portion of the bicycle which is directly contacted by the holder.

Figure 3 is a front elevation of the holder construction illustrated in Figure 2.

Figure 4 is a view illustrating a slight modification of the invention wherein the same is adapted to be used in connection with the trailer hitch.

Figure 5 is an inside view of both clamp members showing the same as apart from each other.

As shown in the drawing:

The reference numeral 10 indicates generally an automobile upon which a bicycle 12 is adapted to be supported by the holder of this invention.

The automobile is provided with the usual rear bumper 14 but it will be obvious that the bicycle may be supported on the front bumper just as readily by the supporting means of this invention, or with slight adaptation, be mounted on the running board or side of the car.

As best illustrated in Figures 2 and 3 the bumper 14 has a clamp element 16 fastened thereto by means of suitable bolts 18 and the element 16 has an integral outwardly extending lug 20 which is provided with an opening therethrough for the reception of a hollow shaft 22 which forms part of the actual supporting element. This shaft is held in position with regard to the lug 20 by means of a suitable bolt 24. Extending upwardly from the hollow shaft 22 and integral therewith is a bifurcated element 25, both bifurcations of which being inwardly curved as shown in Figure 3 to surround and grip the lower face of the crank hanger tube 26 of the bicycle 12.

As will be best evident from the showing in Figures 3 and 5, a pair of cooperating elements 28 is adapted to be fitted onto the element 25 and these are also semi-circularly curved to surmount and grip the opposed or uppermost portion of the crank hanger tube 26 of the bicycle 12.

Bolts 30 are fitted into aligned openings 32 in the bifurcated element 25 and the cooperating pair of gripping members 28 whereby these elements and members can be tightly drawn together about the crank hanger tube of the bicycle for firm supporting purposes.

It will be noted that each element 28 has a rounded projection 34 at its lower end which fits into a similarly curved recess 36 in the juxtaposed face of the element 24 whereby a pivotal action about the point 34 results and a better grip action of the crank hanger tube of the bicycle is effected.

A slight modification of the invention is illustrated in Figure 4 wherein the bracket 16 having the projecting lug 20 is affixed to the bumper 14 of the car in the usual manner by means of bolts, or the like 18, but fitted into the opening in the lug 20 is a trailer hinge arrangement 40 which can be of any desired height. The bicycle clamp means 25—28 surmounts the trailer hitch element 40 and is positioned thereon by means of a supporting bolt 22a similar to the bolt 22.

Obviously this results in a slightly higher positioning of the bicycle itself with respect to the bumper but adequate support is still provided.

Another modification of the invention is illustrated in Figure 5 wherein the two curved elements 28 are joined into a single U-shaped member as shown at 29. This element has a pivoting integral ridge 34a which cooperates with a groove 36 in the juxtapose element 25. In this figure grooves 31 are shown in the element 29 and grooves 33 in the element 25, these grooves being for the reception of cushioning elements composed of felt, or some similar material, whereby better gripping action without marring the finish of the bicycle results.

It will be seen that herein is provided a bicycle carrier which renders an automobile capable of safely transporting a bicycle, with little or no possibility of danger thereto and which may be mounted on bumper bars of varying width or thickness or varying conformation or cross section.

The front wheel of the bicycle 12 can be held in position either by locking the handlebars by means of a theft-proof lock which is supplied on some bicycles or the front wheel can be strapped to the bumper 14 or to one of the frame members of the bicycle by means of an ordinary trunk or luggage strap or some other convenient holder.

Furthermore, no part of the bicycle will at any time contact any part of the automobile so that the finish of either will not be marred. Again, the bicycle may be very quickly mounted or removed from its support by a simple loosening of the bolt 24 which as shown is provided with a socket head for the reception of a suitable wrench but which may be of other types if desired.

The entire fitting when once applied to the bicycle is ordinarily not removed, inasmuch as the bolt 24 comprises the best means of securing the bicycle to its holder, which holder, likewise, is usually not removed from the automobile bumper 14.

There is also no necessity of removing or displacing any part of the bicycle which is to be carried and the carriage of same will not interfere in anyway with the comfort or visbility of the occupants of the automobile.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

1. A bicycle carrier for automobiles including a bracket, means for fastening the bracket to the bumper of an automobile, an extending lug integral with the bracket and clamp means, adapted to surmount the crank hanger tube of the bicycle, positioned in an opening in the lug, said clamp means including a pair of bifurcated elements, one of said elements having an integral downwardly extending shaft adapted to be fitted into the lug opening, and means for pivoting one of said elements about the other element.

2. A bicycle carrier for automobiles including a bracket, means for fastening the bracket to the bumper of an automobile, an extending lug integral with the bracket and clamp means, adapted to surmount the crank hanger tube of the bicycle, positioned in an opening in the lug, said clamp means including a pair of bifurcated elements, one of said elements being pivotally mounted and having an integral downwardly extending shaft adapted to be fitted into the lug opening, and both of said elements being inwardly curved along the bifurcations for surrounding the cylindrically shaped crank hanger tube of the bicycle.

3. A bicycle carrier for automobiles including a bracket, means for fastening the bracket to the bumper of an automobile, a lug integral with the bracket, clamp means, adapted to surmount the crank hanger tube of the bicycle, positioned in an opening in the lug, said clamp means including a pair of bifurcated elements, both of said elements being inwardly curved along the bifurcations for surrounding the cylindrically shaped crank hanger tube of the bicycle, and means for locking the two clamp elements together.

4. A bicycle carrier for automobiles including a bracket, means for fastening the bracket to the bumper of an automobile, a lug integral with the bracket, clamp means, adapted to surmount the crank hanger tube of the bicycle, positioned in an opening in the lug, said clamp means including a pair of bifurcated elements, both of said elements being inwardly curved along the bifurcations for surrounding the cylindrically shaped crank hanger tube of the bicycle, and means for locking the two clamp elements together, said means comprising bolts passing through openings in one clamp element and fitted into screw threaded openings in the other element.

5. A bicycle carrier for automobiles including a bracket, means for fastening the bracket to the bumper of an automobile, a lug integral with the bracket, clamp means, adapted to surmount the crank hanger tube of the bicycle, positioned in an opening in the lug, said clamp means including a pair of bifurcated elements, both of said elements being inwardly curved along the bifurcations for surrounding the cylindrically shaped crank hanger tube of the bicycle, means for locking the two clamp elements together, said means comprising bolts passing through openings in one clamp element and fitted into screw threaded openings in the other element, and means for pivoting one of said clamp elements about the other clamp element.

6. A bicycle carrier for automobiles including a bracket, means for fastening the bracket to the bumper of an automobile, a lug integral with the bracket, clamp means, adapted to surmount the crank hanger tube of the bicycle, positioned in an opening in the lug, said clamp means including a pair of bifurcated elements, both of said elements being inwardly curved along the bifurcations for surrounding the cylindrically shaped crank hanger tube of the bicycle, means for locking the two clamp elements together, said means comprising bolts passing through openings in one clamp element and fitted into screw threaded openings in the other element, and means for pivoting one of said clamp elements about the other clamp element, said means comprising an integral rounded projection on the upper-most clamp element and a corresponding recess in a juxtaposed part of the lower-most clamp element.

7. A bicycle carrier for automobiles including a bracket, means for fastening the bracket to the bumper of an automobile, a laterally extending lug integral with the bracket and having an opening therein, a clamp means adapted to be fitted about the crank hanger tube of a bicycle and means for mounting the clamp means in the opening in the lug, said means comprising a bolt adapted to be fitted into a screw threaded opening in one member of the clamp means, the clamp means including the aforesaid first member and a juxtaposed clamping means adapted to be bolted to the first member, the juxtaposed clamping means comprising a pair of arcuate gripping members.

8. A bicycle carrier for automobiles including a bracket, means for fastening the bracket to the bumper of an automobile, a laterally extending lug integral with the bracket and having an opening therein, a clamp means adapted to be fitted about the crank hanger tube of a bicycle and means for mounting the clamp means in the opening in the lug, said means comprising a bolt adapted to be fitted into a screw threaded opening in one member of the clamp means, the clamp means including the aforesaid first member and a juxtaposed clamping means adapted to be bolted to the first member, the juxtaposed clamping means comprising a U-shaped element with its ends curved to fit about the crank hanger tube of the bicycle.

9. A bicycle carrier for automobiles including a bracket, means for fastening the bracket to the bumper of an automobile, a laterally extending lug integral with the bracket and having an opening therein, a clamp means adapted to be fitted about the crank hanger tube of a bicycle and means for mounting the clamp means in the opening in the lug, said means comprising a bolt adapted to be fitted into a screw threaded opening in one member of the clamp means, the clamp means including the aforesaid first member and a juxtaposed clamping means adapted to be bolted to the first member, the juxtaposed clamping means comprising a U-shaped element with its ends curved to fit about the crank hanger tube of the bicycle, and bolts for joining the two clamping elements together.

EDWARD C. HYDE.

REFERENCES CITED

The following references are of record in the file of this patent:

UNITED STATES PATENTS

| Number | Name | Date |
|---|---|---|
| 2,379,994 | Schwinn | July 10, 1945 |
| 1,834,838 | Hingley | Dec. 1, 1931 |
| 2,248,170 | Hansen | July 8, 1941 |
| 2,210,272 | Turner | Aug. 6, 1940 |
| 2,035,669 | Pribil | Mar. 31, 1936 |
| 2,347,081 | Caton | Apr. 18, 1944 |
| 1,463,409 | Thiess | July 31, 1923 |
| 2,007,497 | Kaplan | July 9, 1935 |

FOREIGN PATENTS

| Number | Country | Date |
|---|---|---|
| 93,243 | Swedish | Nov. 11, 1938 |